United States Patent [19]
Miller

[11] 3,957,390
[45] May 18, 1976

[54] WIND DRIVEN POWER MECHANISM

[76] Inventor: Denver W. Miller, 10208 SE. Telford Road, Boring, Oreg. 97009

[22] Filed: Oct. 30, 1974

[21] Appl. No.: 519,346

[52] U.S. Cl. .................................. 415/5; 416/7
[51] Int. Cl.² ...................................... F01D 23/00
[58] Field of Search ............ 415/4, 148, 5; 416/17, 416/11, 32, 36, 41, 7, 111; 290/55

[56] References Cited
UNITED STATES PATENTS

| | | | |
|---|---|---|---|
| 1,408,988 | 3/1922 | Chenoweth | 416/17 |
| 1,481,397 | 1/1924 | Tetetleni | 415/4 |
| 1,525,600 | 2/1925 | Woolever | 415/5 |
| 1,714,808 | 5/1929 | Oliphant | 416/17 |
| 3,730,643 | 5/1973 | Davison | 290/55 X |

FOREIGN PATENTS OR APPLICATIONS

| 1,168,314 | 10/1969 | United Kingdom | 290/55 |
|---|---|---|---|

*Primary Examiner*—Martin P. Schwadron
*Assistant Examiner*—Robert J. Miller
*Attorney, Agent, or Firm*—Eugene M. Eckelman

[57] ABSTRACT

An elongated base is positioned longitudinally in the direction of the wind and has first and second endless carriers operable longitudinally thereof. A plurality of vanes are operably connected to said carriers such that they are disposed upright for surface engagement by the wind while moving from the rearward end of the base to the forward end and are disposed edgewise to the wind for returning, thus providing a driving force for an output from a shaft of one of the carriers. A plurality of side baffles are provided at a rearwardly inclined angle to direct wind into the vanes from the sides.

6 Claims, 6 Drawing Figures

WIND DRIVEN POWER MECHANISM

BACKGROUND OF THE INVENTION

This invention relates to new and useful improvements in power devices operated by wind forces.

Wind motors have heretofore been provided for the purpose of utilizing the natural forces of the wind for developing an output to drive generators, pumps, etc. Such mechanisms comprise many types of windmills and other rotative structures that utilize mechanically controlled blades. Mechanisms that utilize mechanically controlled blades are exemplified in U.S. Pat. Nos. 1,408,988 and 1,714,808.

Although such mechanisms produce a certain amount of power, they are limited in their output because of the limited blade surface available to the wind at one time and furthermore they require a complex arrangement of structure for changing the blades in directions of operation and return.

SUMMARY OF THE INVENTION

According to the present invention and forming a primary objective thereof, a wind driven power mechanism is provided which is simplified in its construction and operation and which is capable of presenting a plurality of blades or vanes to the wind at one time for producing improved power.

A more particular object of the invention is to provide a mechanism of the type described employing an elongated base on which a pair of carriers extend longitudinally and adapted to present a plurality of vanes at one time with their surface to the wind so that a great amount of driving power is accomplished.

Another object is to provide a wind driven power mechanism of the type described employing a novel manner of presenting the vanes in their upright position to the influence of the wind in driving movement and for positioning the vanes edgewise in a return movement uninfluenced by the wind.

A further object is to provide a wind driven power machanism of the type described utilizing a plurality of side baffles leading outwardly from the base at a rearwardly inclined angle to direct wind forwardly into the vanes from the sides, thus picking up additional wind force to increase the power output of the device.

The invention will be better understood and additional objects and advantages will become apparent from the following description taken in connection with the accompanying drawings.

BRIEF DESCRIPTION OF THE DRAWINGS

FIG. 3 is an enlarged fragmentary sectional view taken on a line similar to FIG. 1 but detailing one end of a carrier of the mechanism, a portion of this view being shown in broken lines for clarity;

FIG. 4 is an enlarged fragmentary elevational view taken similar to FIG. 3 but detailing the other end of the carrier shown in FIG. 3;

FIG. 5 is a fragmentary vertical sectional view taken on the line 5—5 of FIG. 4.

DETAILED DESCRIPTION OF A PREFERRED EMBODIMENT

Figure 1:
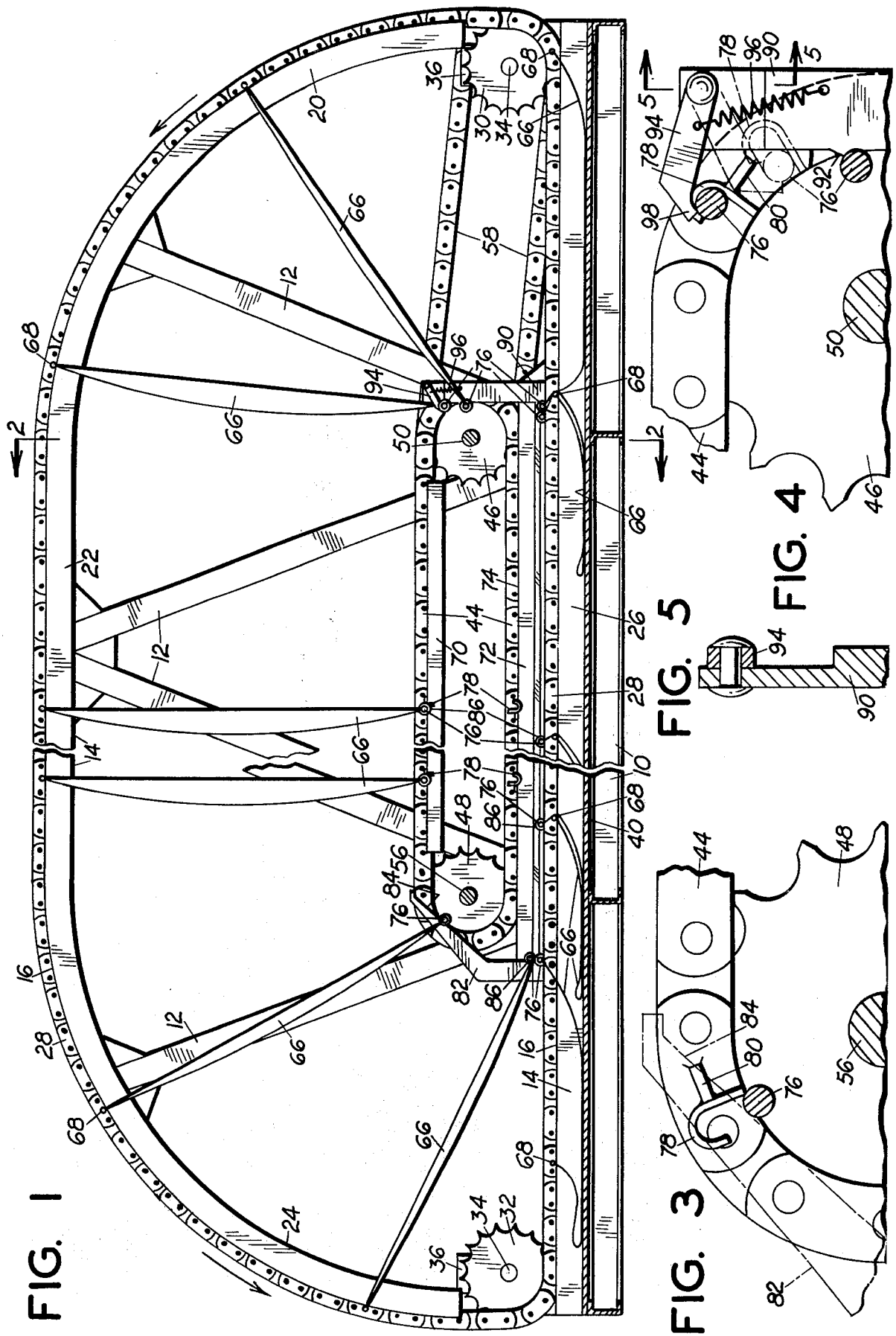
FIG. 1 is a vertical sectional view of the wind driven power device of the invention, this view being taken on the line 1—1 of FIG. 2 and being foreshortened in its length.
Figure 2:
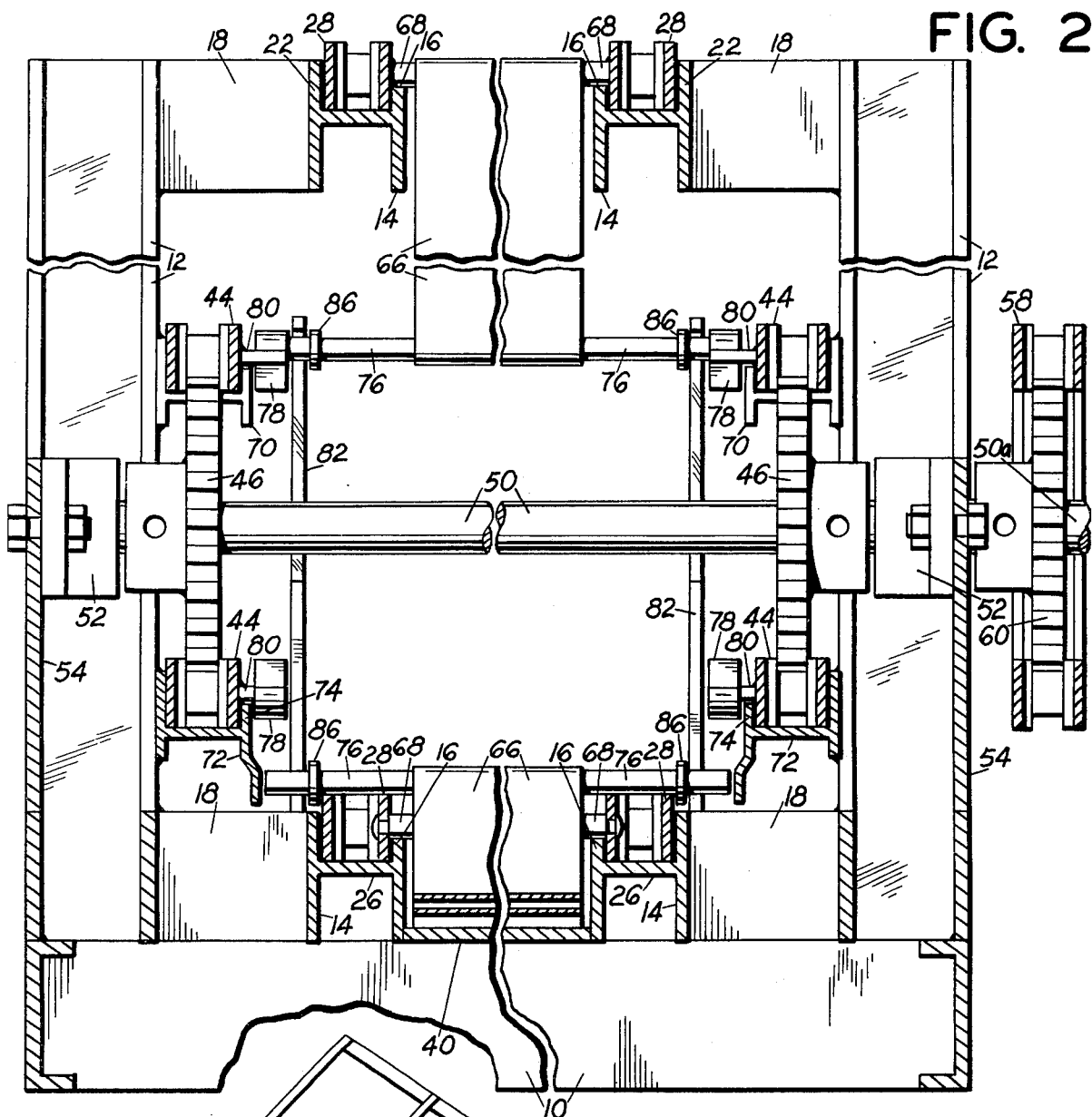
FIG. 2 is a vertical sectional view taken on the line 2—2 of FIG. 1, this view being foreshortened both in its height and width.

With particular reference first to FIGS. 1 and 2, the present mechanism has a base 10 of suitable structure such as integrated angle iron frame members extending longitudinally and transversely in a well known manner. The base integrally supports a plurality of upright struts 12 on each side, and such struts support a track 14 of H-shaped frame structure on each side. These tracks have a shortened side wall portion 16 on their inner sides at the top. Tracks 14 are secured to the struts by inwardly directed support arms 18. Arms 18 are of a length to position the tracks 14 inwardly from the sides a selected distance for a purpose to be described hereinafter. Track 14 has a rearward curved portion 20, an elongated straight portion 22, a front curved portion 24, and a straight bottom portion 26.

An endless chain 28 operates in each track 14 and has end meshing engagement with sprocket wheels 30 at the rearward end of the base and sprocket wheels 32 at the forward end. Sprocket wheels 30 and 32 are rotatably mounted on stub shafts 34 suppported on standards 36 integral with the base on the outer side of their respective sprocket wheels. By the outer disposition of the standards 36 relative to their sprocket wheels, the lateral area between pairs of the sprocket wheels is open. Tracks 14 at each of their forward and rearward ends terminate adjacent the upper end of the sprocket wheels, the chains 28 being held stable in these areas by the sprocket wheels.

A floor 40 is supported on the base 10 between the bottom runs 26 of the tracks 14.

A pair of second endless chains 44 are provided in the mechanism, and these chains operate over rear sprocket wheels 46 and front sprocket wheels 48. Rear sprocket wheels 46 are keyed to a cross shaft 50 journaled in bearings 52 secured to standards 54 supported on the base 10, and front sprocket wheels 48 are keyed on a cross shaft 56 having journaled support on standards the same as shaft 50.

Figure 6:
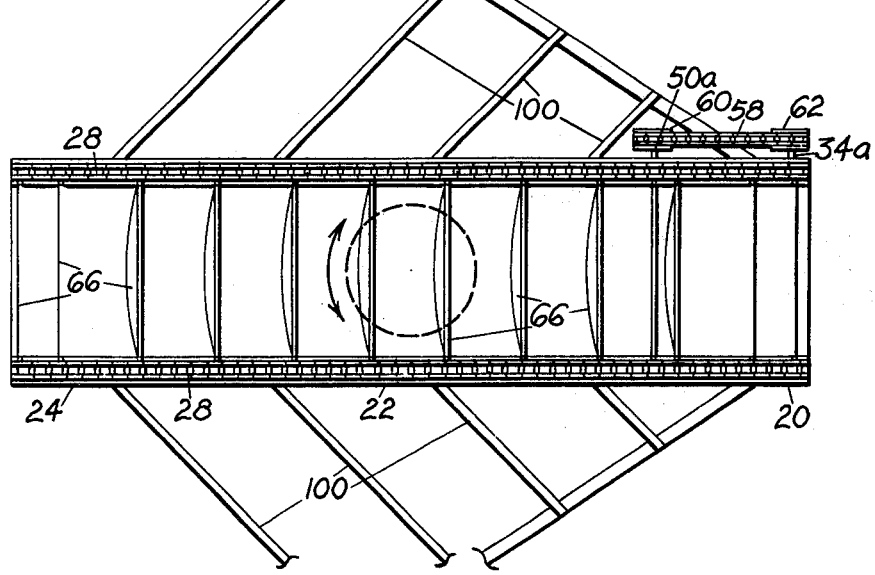
FIG. 6 is a top plan view in somewhat diagrammatic form of the present assembly showing side baffle extensions.

One of the rear shafts 34 has a side extension 34a and this shaft portion is coupled to shaft 50 by a connecting chain 58, FIGS. 2 and 6, having meshing engagement with a sprocket wheel 60 on a projecting end 50a of shaft 50 and a sprocket wheel 62 on the projecting end 34a of shaft 34. Sprocket wheels 60 and 62 are of the same size so that shafts 34 and 50 operate at the same speed. Consequently, the two chains 28 and 44 operate at the same linear speed. Shaft extension 50a is adapted for connection to means to be driven by the present power mechanism such as electric power generating means, pump means, or the like.

The mode of power developed by the present device is accomplished by a plurality of vanes 66 which have operative connection at opposite ends to chains 28 and 44 in an arrangement whereby they are disposed upright for surface engagement by the wind along upper runs of the chains and are disposed edgewise in a return movement along lower runs of the chains. Vanes 66 are in the form of flexible sails so that they are capable of being disposed upright for driving wind engagement and are collapsible for return movement by means now to be described.

The upper ends of the vanes 66 have a loop connection on cross bars 68 secured to opposite links of the two chains 28, the bars 68 extending over the top of the short walls 16 for their integral connection with the chains. Bars 68 are connected in uniformly spaced relation around the chain 28, and such bars have permanent connection to the chains whereby they are carried by such chains around upper driving and return runs. The chains 44 and their sprocket wheels 46 and 48 are disposed laterally outwardly relative to chains 28, and since the sprocket wheels 30 and 32 are supported by posts disposed on the outside thereof, the bars 68 are free to move with the chain around the entire length of the latter without any obstruction.

The other ends of the vanes 66 from their connection with the chain 28 have on and off connection with the chains 44 in view of the difference in length of the two carriers formed by the chains. The upper run of chains 44 operate in tracks 70, and the lower runs thereof operate in tracks 72, these two tracks being secured to standards 54 and appropriate ones of the struts 12. Tracks 70 and 72 are somewhat H-shaped in cross section and have an inner wall portion 74 thereof shortened at the top. The lower ends of vanes 66 have a loop connection with cross bars 76 and these cross bars at their ends have detachable engagement with hook-shaped connector members 78 secured to the chains 44. These connector members are spaced inwardly of the tracks 72 by horizontal support fingers 80, such fingers extending over the top of short wall 74. Members 78 are secured to selected links of the chains 44 in a spacing identical to the connected spacing of the bars 68 on the chains 28. The secured positioning of the connector members on the chains 44 is such that the hook opening faces downwardly when said connector members are on the top run of the chain. Consequently, as the connector members 78 move around the forward end sprocket wheels 48, they will progressively turn over and be disposed with the hook opening facing upwardly when they are on the bottom run of the chain. Likewise, the members 78 will progressively turn over to their inverted position as they move around the sprocket wheels 46.

With particular reference to FIGS. 1 and 3, disconnecting arms 82 are secured to the base, one on each side at the front of the sprocket wheels 48, and these arms tilt rearwardly such that a rearward edge 84 thereof is in the path of cross bars 76 as the latter move around with the connector members to the forward end of the sprocket wheels 48.

The arrangement is such that the arms 82 will force the bars out of the connector members 78 as the bars move around the sprocket wheels. As illustrated in FIG. 3, a bar has moved around to the point where it has been freed from a pair of the connector members, and after such disconnection, the bars 76 will fall onto the chain 28 for movement therewith to a rearward pickup position to be described. The lateral positioning of the disconnecting arms 82 is shown in phantom lines in FIG. 2, such arms being disposed just inwardly of the connector members 78. To hold the bars 76 against axial movement when they have left the connector members 78, they are provided with collars 86 which engage against the outer sides of chains 28. Furthermore each track 72 has an inner depending extension 88 in the plane of the bars 76 to maintain the bars 76 in the proper position.

As the bars 76 move along the chains 44 to the rearward end thereof, it is necessary that they be rehooked with the connector members 78, and in this regard particular reference is made to FIGS. 1, 4 and 5. Remembering that the bars 68 are connected to the chain 28 at all times, it will be understood that as they move with the chain along the lower run thereof, they will run against a collapsed portion of a vane 66 and carry such vane and its bar 76 therealong. Upright stop posts 90 are provided on each side of the sprocket wheels 46 rearward thereof and in the path of the ends of bars 76. FIGS. 1 and 4 show only one of such posts but is to be understood that one such post is disposed on each side. As the bars engage stop posts 90 they will be detained in such position temporarily while the other end of the vane continues to travel rearwardly. The connected end of the vanes, namely, the end at bars 68 will move up the rearward curved portion 20 and reach a height that will pull the bar up the forward edge of the post 90. This post has a projection 92 that will stop the bar 76 until the other end of the vane moves pretty well up the curved rearward portion 20. As the upper end of the vane becomes higher with the chain 28, it will eventually jump over the projection 92 and engage a connector member 78 for its re-connection.

To insure connection of the bars 76 with the connector members 78, at the sprocket wheels 46, guide fingers 94, FIG. 4, are pivotally mounted on the posts 90 and are urged downwardly by a tension spring 96. Fingers 94 have a downturned end portion 98, and this downturned portion is arranged to initially extend over the bars 76 as they approach the upper portion of the sprocket, as seen in phantom lines in FIG. 4. With the spring pressure thereon, the guide fingers 94 will insure that the bars ride into the hook portion of the connector members 78, namely to a position shown in full lines in FIG. 4. With the arrangement of the structure to reconnect the vanes 66 with the chains 44, the delay of the bars 76 against the posts 90 and against the projections 92 is such that the connector members 78 that pick up the bars 76 at the rearward end will be such as to be vertically aligned with a bar 68 connected to the chains 28 so that the vane connected therebetween will be substantially upright for its travel in its driving movement along the longitudinal length of the mechanism.

In the operation of the device, the vanes 66 are connected between the chains 28 and 44 in upright wind driving position along the upper run of the chains 28, at least along the straight portion 22 of such chains. The driving force of the wind against the vanes maintains the chains 28 and 44 in movement so that motive power can be taken from the shaft end 50a. As the upper ends of the vanes 66 move down over the forward end of the mechanism, the lower ends will be disconnected from the chains 44 by the disconnecting arms 82. The disconnected ends of the vanes are driven along on top of chains 28 as described above until such time that they are engaged against posts 90, whereupon the connected ends with chains 28 can move around the corner and again move to an upright wind engaging position.

According to the present invention, a wind driven mechanism is provided that can utilize any number of vanes 66 in a driving position at one time, the assembly being of any length desired. To more fully utilize wind forces, the device includes a plurality of side baffle plates 100, FIG. 6, that lead outwardly from the base at a rearwardly inclined angle to direct wind forwardly into the vanes from the sides. Such baffle plates serve to pick up an additional amount of wind for increasing the power output of the mechanism.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A wind driven power mechanism comprising
    a. an elongated base having forward and rearward ends and arranged to be disposed longitudinally in the direction of wind movement,
    b. a first endless carrier extending longitudinally of said base and having an upper run and a lower return run,
    c. a second endless carrier also extending longitudinally of said base and having an upper run and a lower return run,
    d. the upper run of said first endless carrier being disposed above the upper run of said second endless carrier,
    e. a plurality of flexible sail-type vane means having upper and lower ends,
    f. first connecting means operably connecting said vane means to said carriers for movement along the upper runs of said carriers in an upright position for surface engagement by the wind for driving said carriers longitudinally,
    g. second connecting means operably connecting said vane means to said carriers for movement along the lower runs of said carriers in a horizontal position for return movement uninfluenced by the wind,
    h. and output means from said device driven by one of said carriers.

2. The wind driven power mechanism of claim 1, wherein said carriers comprise endless chains operating over end sprockets.

3. The wind driven power mechanism of claim 1, wherein said first endless carrier is of greater length than said second endless carrier and said first and second means are arranged such that said vane means tilt up at the rearward end of said base for moving from their edgewise wind uninfluenced position to their position having surface engagement by the wind and said vane means tilt down at the forward end of said base for movement to their wind uninfluenced position.

4. The wind driven power mechanism of claim 3, wherein said second connecting means include disconnectors at the forward end of the lower return run of said second endless carrier to disconnect the lower ends of said vane means from said second endless carrier in the said lower return run thereof, and pickup means at the rearward end of the lower return run to pick up said lower ends of said vane means for connected movement of the vane means along the upper run of said second endless carrier.

5. The wind driven mechanism of claim 1, wherein said upper run is of an elongated length and a plurality of said vanes are always disposed upright at one time for driving function.

6. The wind driven power mechanism of claim 5, including a plurality of side baffles leading outwardly from said base at a rearwardly inclined angle to direct wind forwardly into the vanes from the sides.

* * * * *